March 13, 1962 R. L. McGLASSON 3,024,651
METHOD AND APPARATUS FOR THE TESTING OF A TUBULAR MEMBER
Filed Jan. 12, 1959 3 Sheets-Sheet 1
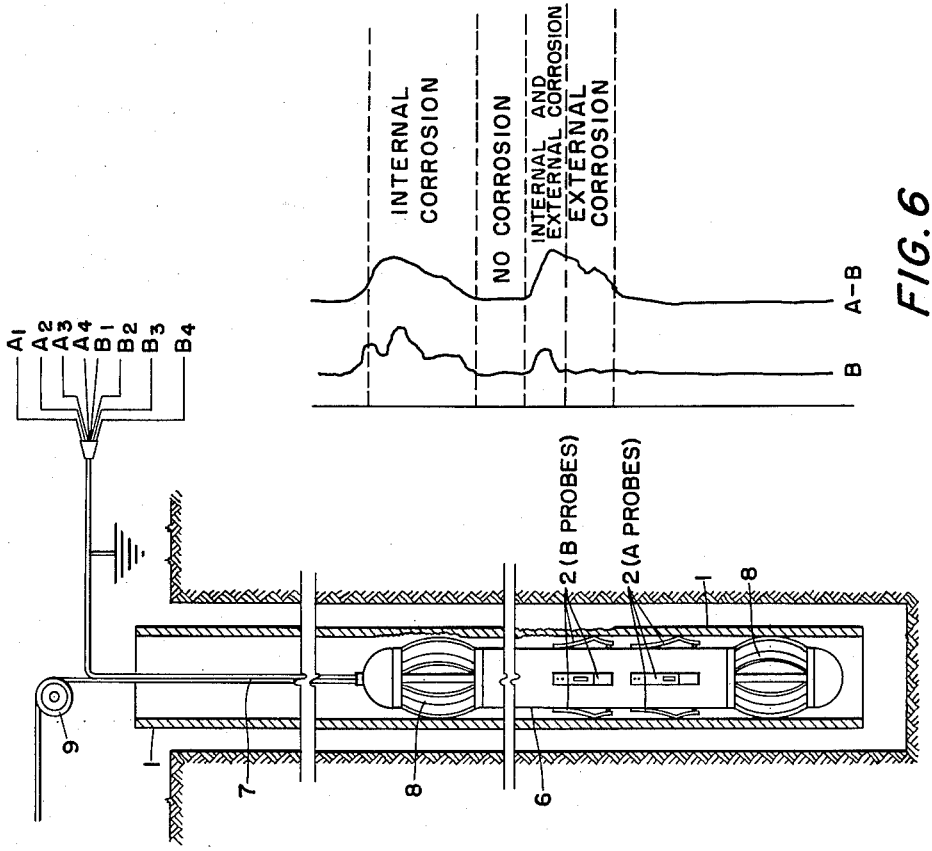
INVENTOR.
ROBERT L. McGLASSON
BY
Jerome B. Peterson
ATTORNEY March 13, 1962  R. L. McGLASSON  3,024,651
METHOD AND APPARATUS FOR THE TESTING OF A TUBULAR MEMBER
Filed Jan. 12, 1959  3 Sheets-Sheet 2

INVENTOR.
ROBERT L. McGLASSON
BY
Jerome B. Peterson
ATTORNEY

March 13, 1962 R. L. McGLASSON 3,024,651
METHOD AND APPARATUS FOR THE TESTING OF A TUBULAR MEMBER
Filed Jan. 12, 1959 3 Sheets-Sheet 3

INVENTOR.
ROBERT L. McGLASSON
BY Jerome B. Peterson
ATTORNEY

United States Patent Office 3,024,651
Patented Mar. 13, 1962

3,024,651
METHOD AND APPARATUS FOR THE TESTING OF A TUBULAR MEMBER
Robert L. McGlasson, Ponca City, Okla., assignor to Continental Oil Company, Ponca City, Okla., a corporation of Delaware
Filed Jan. 12, 1959, Ser. No. 786,418
3 Claims. (Cl. 73—151)

This invention relates to the testing of a tubular member to determine the internal and external profiles thereof. More particularly this invention relates to a method of and apparatus for the testing of a tubular member such as an oil well casing to determine the internal and external profiles of such member in order that internal and external corrosion may be determined. Still more particularly this invention relates to the continuous measurement of the profile of the internal surface of a piece of tubular goods as well as the measurement indirectly of the wall thickness thereof, from which the external profile may be determined.

In the production phase of the oil industry corrosion, both internal and external, of the casing of the oil well presents a serious problem. Information as to the internal and external corrosion of an oil well casing would be extremely valuable in order that preventive measures (such as cathodic protection) may be employed in cases where corrosion is taking place. Well logging devices for determining the internal profile of a well casing or tubing are well known in the prior art. Such a device is disclosed in U.S. Patent No. 2,322,343 wherein a set of levers or calipers is forced into contact with the tubing whereby a continuous profile of the internal surface of the tubing may be obtained by measurement of the deflection of said levers as the device is moved through the tubing. U.S. Patent No. 2,656,613 discloses an apparatus for calipering well bores comprising a housing having a plurality of flexible arms secured in circumferentially spaced relation around the housing and urged outwardly into contact with the well bore. A strain gauge is mounted on each flexible arm to indicate the bending of the arms as the device is moved upwardly through the well bore. Other caliper devices suitable for measuring the internal profile of a tubular member are disclosed in U.S. Patent Nos. 2,695,546 and 2,721,110. All of the above-mentioned devices operate on the principle of measuring irregularities in the internal surface of the tubing by measurement of the deflection of levers or calipers urged against the internal surface of the tubing.

One object of this invention is to provide a method and apparatus for determining the external profile of a tubular member. Another object of this invention is to provide a method and apparatus for simultaneously determining the internal and the external profile of a tubular member. Another object of this invention is to provide a method and apparatus for continuously measuring and recording representations of variations in the internal surface and wall thickness of a tubular member such as an oil well casing, whereby a log of the internal and external profiles of the tubing may be obtained. Other objects and advantages will be apparent from the following description taken in connection with the accompanying drawings. It is to be understood, however, that the drawings are for the purpose of illustration and description only and are not intended as a definition of the limits of the invention.

FIGURE 1 is a cross-section of an apparatus suitable for use in the present invention shown in position in a tubular member;

FIGURE 2 is a cross-section of a well bore containing the apparatus of the present invention;

FIGURE 6 is a plot of the internal and external profile of the well bore vs. the depth of the well.

Figure 3:
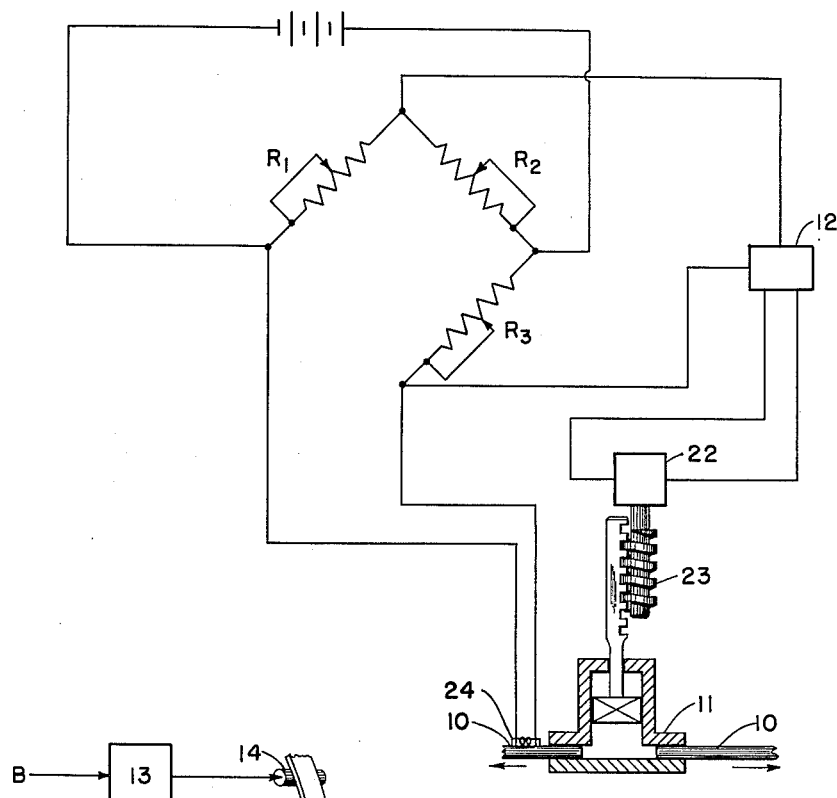
FIGURE 3 is a diagrammatic representation of a constant loading device together with the controlling circuitry therefor.

Broadly stated, my invention relates to a new method of and apparatus for determining the internal profile and wall thickness of a tubular member involving the steps of: determining the internal profile of the tubular member at a plurality of points circumferentially spaced within the tubular member; and simultaneously with said first step, subjecting successive regions of the wall of the tubular member, at a second plurality of points spaced from but axially-aligned with said first plurality of points, to a constant force sufficient to induce appreciable strain therein, and continuously detecting deflections in the wall of the tubular member caused by the force exerted thereupon.

The internal profile is detected by means of a set of probles urged against the wall of the tubular member, whereby the probes will be deflected in accordance with irregularities in the internal surface. The deflection of the probes causes strain in the probes and such strain is detected by means of strain gauges, one secured to each probe.

The wall thickness is detected by means of a second set of probes, spaced from but in axial alignment with the first set. This second set of probes is urged against the tubular member by a constant force sufficient to cause appreciable strain in the wall of the tubular member, thereby causing a corresponding deflection of the probes. The strain thereby induced in the probes is measured by strain gauges, one secured to each probe of this second set of probes.

The first set of probes thus detects the internal irregularities in the wall of the tubular member, whereas it is apparent that the second set of probes will detect the sum of the variations in the internal surface and wall thickness. In the preferred embodiment of this invention the signals from the first set of probes (delayed in point of time to compensate for the fact that the two sets of probes are spaced from one another) is subtracted from the corresponding signals from the second set of probes, prior to recording of the signals, so that a record of the wall thickness may be obtained. The delay of the signal from the first set of probes, and the subtraction of this signal from the other signals, are performed by conventional apparatus and circuitry. In the preferred embodiment the signals from the first set of probes are also recorded directly, so that records of both the internal profile and the wall thickness may be obtained. The desired signals, after amplification, are then recorded by means of conventional electrical-mechanical data-recording devices. Having a record of the internal profile and the wall thickness of the tubular member, it is a simple matter to determine the external profile.

FIGURE 1 is a cross-section of the operating portion of an apparatus for use in the present invention inserted in a well casing 1. A plurality of flexible arms 2 are secured to housing 3, and are circumferentially disposed about the circular housing member. There are two sets of these flexible arms (hereinafter referred to as probes), each set comprising a plurality of at least two and preferably four or more probes. The upper set of probes will be referred to herein as the "B" probes which are urged against the interior of the tubing member by spring means 4. Springs 4 are of such size that the "B" probes are merely kept in contact with the inside surface of the tubular member.

The lower "A" probes are forced against the interior of the tubing member by constant loading device 5 which exerts a constant force sufficient to produce appreciable strain on the wall of the tubular member. The bending arms of the "A" probes must be sufficiently long to allow displacements equivalent to the thickness of the casing and still retain sufficient elastic force to produce measurable strain in the wall of the tubing member. These "A" probes will be deflected in accordance with the sum of the variation in the internal surface and wall thickness. Such deflection of the probes is detected by strain gauges $G_A$, one secured to each of the plurality of "A" probes.

The design and operation of the strain gauges is not shown herein because such is within the knowledge of any technician skilled in the art.

The signals B and A from the strain gauges $G_B$ and $G_A$, respectively are conducted to the surface for processing as hereinafter described.

FIG. 2 shows a cross-sectional view of an oil well casing 1 with the apparatus of this invention inserted therein. The tool 6, supported by cable 7, is maintained in its proper position by means of centralizers 8 while it is drawn up through the casing. The "B" probes and the "A" probes are in contact with the internal surface of the casing, and continuously detect variations in the internal surface and wall thickness as indicated above. The tool is pulled up the well by means of cable 7, which is wound upon reel 9. The signals $A_1$, $A_2$, $A_3$, $A_4$, and $B_1$, $B_2$, $B_3$, and $B_4$ are conducted to the surface and are processed and recorded as hereinafter described.

As indicated above, FIGURE 3 exemplifies a suitable constant loading device 5. The force to the "A" probes is supplied through load arms 10, which are actuated by hydraulic mechanism 11. The force is maintained at a constant magnitude by means of servo mechanism 12, motor 22, and worm-screw rack and pinion 23. Servo mechanism 12 is actuated by the bridge circuit shown, of which strain gauge 24 is the controlling input arm. Resistors $R_1$, $R_2$ and $R_3$ are set so that the entire loading mechanism is in balance when the strain on load arms 10 is at the desired value. When the load induced by load arms 10 falls above or below the desired value, the discrepancy is detected by strain gauge 24, the bridge circuit falls out of balance, and the servo mechanism actuates motor 22 to adjust the pressure upon the hydraulic mechanism. In the device of FIG. 3, only one control strain gauge is needed, because the load arms are of equal cross-sectional area, and will respond to the hydraulic pressure to produce an equal force on each arm.

It will be obvious that other devices may be substituted for the system set forth in FIG. 3 so long as provision is made for a constant force to load arms 10. For example a taper thread system may be employed in place of the hydraulic pressure system of FIG. 3.

Figure 4:
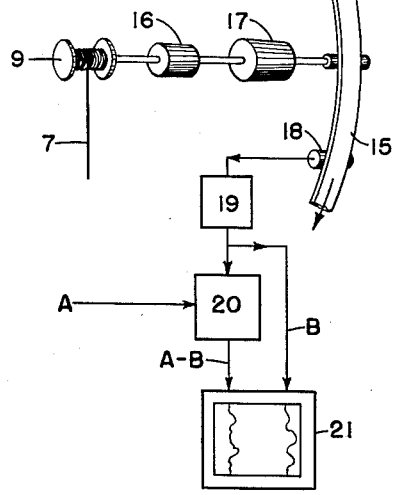
FIGURE 4 is a diagrammatic representation of apparatus for processing and recording the signals received from the device of FIG. 1.

FIG. 4 schematically illustrates the apparatus for processing and recording the signals B and A from strain gauges $G_B$ and $G_A$, respectively. For purposes of illustration the processing of signals from one "B" and one "A" probe is shown in FIG. 4, it being understood that in actual operation a plurality of "B" and "A" probes are employed. The signal from the "B" probes is passed to amplifier-modulator 13, which amplifies and modulates the low-frequency signal from the "B" strain gauges so that such signals may be recorded on moving magnetic tape 15 by means of recording head 14. The movement of tape 15 is synchronized with the movement of tool 6 by mechanical linkage of reel 9 to tape transporting mechanism 17 by means of coupling 16. Pick-up or reading head 18 therefore picks-up the "B" signal at a time later than it is recorded; the time delay interval is adjusted to correspond to the vertical distance between the "B" and the "A" probes. After demodulation of the delayed "B" signal in demodulator 19, the "B" signal is then subtracted from the "A" signal in difference-amplifier 20, to give a signal (A—B) representative of the wall thickness of the casing 1. This latter signal is then recorded by suitable means such as chart recorder 21. The "B" signal is also recorded, as shown in FIG. 4, so that representations of the internal profile and wall thickness may be obtained.

A magnetic recording drum may be used in place of a plurality of tapes such as tape 15, in which case a plurality of recording and reading heads are employed.

The circuitry of amplifier-modulator 13, demodulator 19, and difference amplifier 20 are not further described because the construction of such devices is well known in the art.

Figure 5:
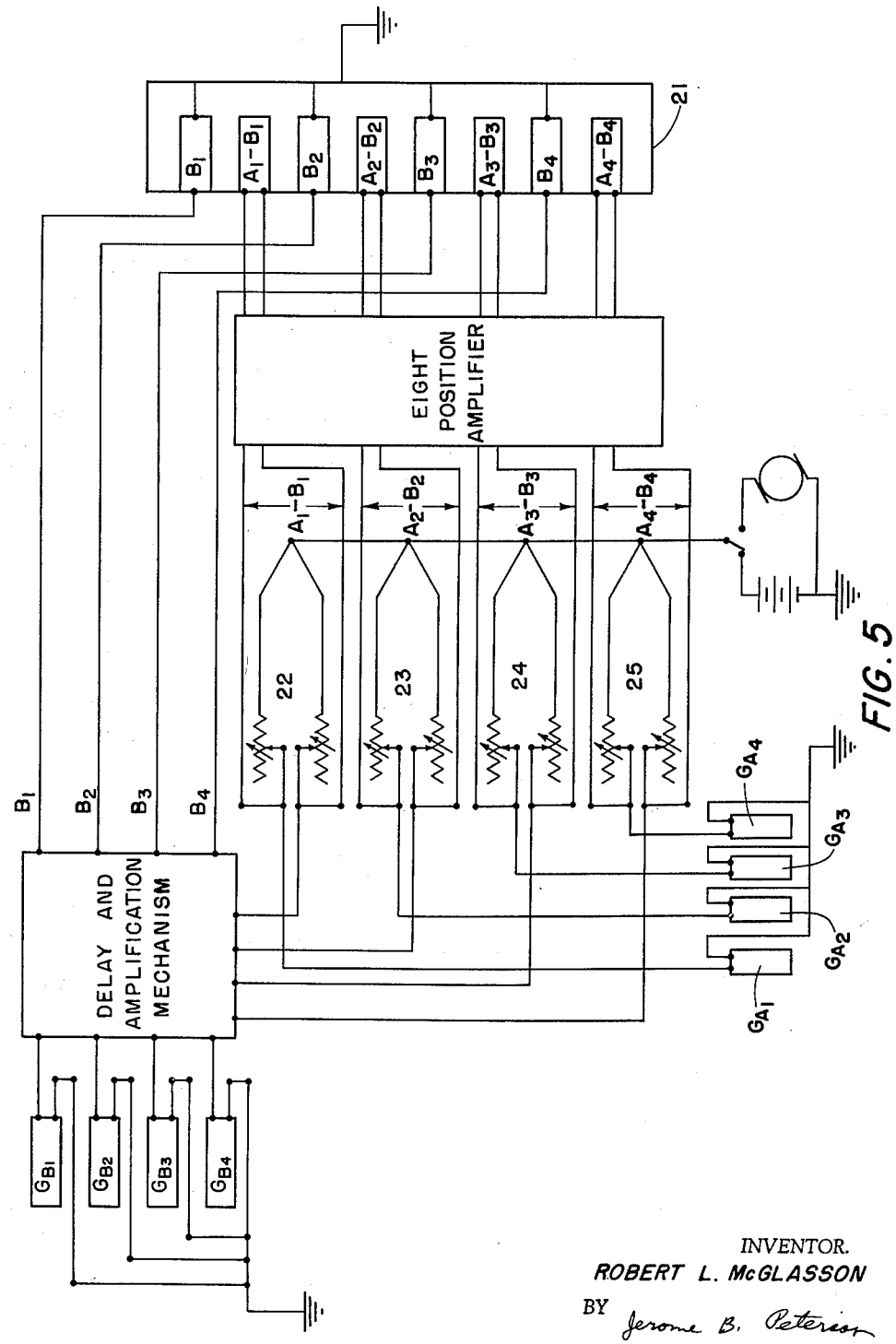
FIGURE 5 is a simplified schematic diagram showing circuitry suitable for use in this invention.

FIG. 5 is a simplified schematic representation of the entire circuitry used in this invention, and illustrates the manner in which the signals from the "B" and "A" probe strain gauges $G_B$ and $G_A$ are electrically processed. The signals from the "B" probe strain gauges ($G_{B_1}$, $G_{B_2}$, $G_{B_3}$, and $G_{B_4}$) are amplified and delayed, and are then subtracted from the signals from the "A" probe strain gauges ($G_{A_1}$, $G_{A_2}$, $G_{A_3}$, and $G_{A_4}$), in Wheatstone bridge circuits 22, 23, 24, and 25, respectively. The resulting signals ($A_1$—$B_1$, $A_2$—$B_2$, $A_3$—$B_3$, and $A_4$—$B_4$) are amplified and then recorded on recorder 21. The resulting record is representative of the wall thickness of the tubular member 1. The signals from the "B" probe strain gauges are also amplified and recorded, so that records of both the internal profile and wall thickness may be obtained.

FIG. 6 is a plot of the signal variations B and A—B, representative of the internal profile and the wall thickness, respectively, of the casing 1 at one of the plurality of points at which a profile is detected. The vertical scale of this plot represents depth of the well illustrated in FIG. 2. A profile of the external surface of the casing can be readily obtained by simply comparing the internal profile curve with the wall thickness curve.

From the foregoing it can be seen that this invention provides a method of and apparatus for determination of the internal profile, wall thickness, and external profile of a tubular member. It will be apparent to those skilled in the art that while preferred embodiments of the invention have been shown and described, modifications can be made without departing from the principles and spirit of the invention. The aforesaid embodiments are therefore exemplary rather than restrictive of the invention, the scope of which is set forth in the appended claims, and those modifications which lie within the meaning and range of equivalency of the claims are included therein.

I claim:

1. A method of determining the variations in the internal surface and wall thickness of a tubular member comprising the steps of continuously: (1) testing successive regions of the inside wall of said member to detect the internal irregularities in said wall at a first plurality of points circumferentially spaced within the tubular member, forming a first series of electrical signals representative of said irregularities, and recording a parameter of said first series of signals; (2) simultaneously with the first step, subjecting said regions of the inside wall of the tubular member, at a second plurality of points spaced from but axially-aligned with said first plurality of points, to a constant force sufficient to induce appreciable strain in said wall, detecting deflections in said wall caused by said constant force and forming a second series of electrical signals representative of said deflections; (3) subtracting the first series of electrical signals from the respective second series of electrical signals corresponding to the same points on said wall, and recording a parameter of the differences between said respective first and second signals.

2. The method of claim 1 in which the first series of signals are delayed in point of time an amount corresponding to the distance between the first plurality of points and the second plurality of points, prior to subtracting said first series of signals from said second series of signals.

3. A tool for measuring the internal profile and wall thickness profile of a tubular member comprising: a housing of a size to be moved through the tubular member; a first plurality of probes secured to and spaced circumferentially about the outer periphery of said housing, each of said probes comprising a flexible arm urged into contact with the inner wall of the tubular member; a second plurality of probes secured to and spaced circumferentially about the outer periphery of said housing in spaced but axially-aligned relationship to said first plurality of probes, each of said second plurality of probes comprising a flexible arm; means, connected to each of said second plurality of probes, for supplying to said probes a constant force in an outward direction from said housing, said constant force being of sufficient magnitude to induce appreciable strain in the wall of said tubular member; means secured to each of said probes for producing a first series of signals representative of the deflections of said first plurality of probes and a second series of signals representative of the deflections of said plurality of probes; means for recording a parameter of said first series of signals; means for delaying said first series of signals an amount corresponding to the distance between said first plurality of probes and said second plurality of probes; means connected to said delaying means for subtracting the delayed first series of signals from the second series of signals; means for recording a parameter of the difference between said first and said second series of signals; and means secured to said housing for pulling said housing lengthwise through said tubular member.

References Cited in the file of this patent

UNITED STATES PATENTS

| | | |
|---|---|---|
| 2,672,050 | Sewell | Mar. 16, 1954 |
| 2,815,578 | Broussard | Dec. 10, 1957 |
| 2,854,758 | Owen | Oct. 7, 1958 |

UNITED STATES PATENT OFFICE
CERTIFICATE OF CORRECTION

Patent No. 3,024,651                            March 13, 1962

Robert L. McGlasson

It is hereby certified that error appears in the above numbered patent requiring correction and that the said Letters Patent should read as corrected below.

Column 2, line 24, for "probles" read -- probes --; column 6, line 4, after "said" insert -- second --.

Signed and sealed this 10th day of July 1962.

(SEAL)
Attest:

ERNEST W. SWIDER
Attesting Officer

DAVID L. LADD
Commissioner of Patents